US008014382B2

(12) United States Patent
Bachir et al.

(10) Patent No.: US 8,014,382 B2
(45) Date of Patent: Sep. 6, 2011

(54) ROUTING METHOD, TRANSCEIVER STATION AND COMPUTER PROGRAM FOR CARRYING OUT THE METHOD

(75) Inventors: Abdelmalik Bachir, Grenoble (FR); Dominique Barthel, Bernin (FR)

(73) Assignee: France Telecom, Paris (FR)

( * ) Notice: Subject to any disclaimer, the term of this patent is extended or adjusted under 35 U.S.C. 154(b) by 724 days.

(21) Appl. No.: 11/919,436

(22) PCT Filed: Apr. 24, 2006

(86) PCT No.: PCT/FR2006/000913
§ 371 (c)(1),
(2), (4) Date: Oct. 26, 2007

(87) PCT Pub. No.: WO2006/114511
PCT Pub. Date: Nov. 2, 2006

(65) Prior Publication Data
US 2008/0159259 A1 Jul. 3, 2008

(30) Foreign Application Priority Data
Apr. 28, 2005 (FR) ..................................... 05 04312

(51) Int. Cl.
*H04L 12/28* (2006.01)
*H04W 4/00* (2009.01)

(52) U.S. Cl. ........................................ 370/351; 370/254

(58) Field of Classification Search .................. 370/351, 370/315, 311, 390, 432, 254, 338, 310, 255
See application file for complete search history.

(56) References Cited

U.S. PATENT DOCUMENTS

| 7,693,122 | B2* | 4/2010 | Carlson et al. ................ 370/341 |
| 2004/0252643 | A1* | 12/2004 | Joshi ............................ 370/238 |
| 2005/0063317 | A1* | 3/2005 | Risberg et al. ............... 370/254 |
| 2005/0099971 | A1* | 5/2005 | Droms et al. ................. 370/328 |
| 2005/0226156 | A1* | 10/2005 | Keating et al. ............... 370/235 |
| 2005/0249186 | A1* | 11/2005 | Kelsey et al. ................. 370/349 |

OTHER PUBLICATIONS

Xiaoxing, "Broadcasting for Network Lifetime Maximization in Wireless Sensor Networks", IEEE, p. 352-358, 2004.
Intanagonwiwat, et al., "Directed Diffusion for Wireless Sensor Networking", IEEE, p. 2-16, 2003.
Boukerche, et al., Energy-Aware Data-Centric Routing in Microsensor Networks, ACM, p. 42-49, Sep. 19, 2003. XP-001186205.
Al-Karaki, et al., "Routing Techniques in Wireless Sensor Networks: A Survey", IEEE, p. 6-28, 2004. XP-001217358.
Brown, et al., "The Energy Aware Dynamic Source Routing Protocol", University of Colorado, Boulder, p. i-25, Dec. 23, 2003.
Toh, et al., "Performance Evaluation of Battery-Life-Aware Routing Schemes for Wireless Ad Hoc Networks", IEEE, p. 2824-2829, 2001.

* cited by examiner

*Primary Examiner* — Brian Nguyen
(74) *Attorney, Agent, or Firm* — McKenna Long & Aldridge LLP

(57) ABSTRACT

A routing method, apparatus, and computer readable medium storing instructions to perform the method in a network having a set of communication nodes, to establish a route from at least one source node to a destination node, which includes broadcasting a request from the destination node, examining, in response to reception of the request at an intermediate node, whether the intermediate node previously received the request, and if the request was not previously received by the intermediate node, systematically rebroadcasting the request from the intermediate node with a delay that is a function of a routing metric associated with the intermediate node, and repeating the examining and rebroadcasting until the at least one source node is reached.

10 Claims, 2 Drawing Sheets

ROUTING METHOD, TRANSCEIVER STATION AND COMPUTER PROGRAM FOR CARRYING OUT THE METHOD

This application claims priority from PCT/FR2006/000913 filed Apr. 24, 2006, which claims priority from French Application FR 05 04312, filed Apr. 28, 2005, both of which are hereby incorporated by reference in their entirety as if fully set forth herein.

FIELD OF THE DISCLOSURE

The present invention relates to the routing techniques used in telecommunications networks. It applies particularly, but not exclusively, in ad hoc networks.

BACKGROUND

Ad hoc networks are communication networks without a fixed infrastructure. A number of wireless stations are equipped with radio transceiver means and appropriate protocols for forming the ad hoc network.

These stations making up the ad hoc network can be in the form of fixed or portable computers, pocket computers, mobile telephones, vehicles, electrodomestic appliances, etc. The transceiver means can also be associated with simple objects such as sensors or actuators. An ad hoc network of sensors thus makes it possible to collect information for example with a view to monitoring or checking installations.

The success of ad hoc networks depends a great deal on the lifetime of the stations constituting the nodes of the network. Energy saving is a crucial factor when designing sensor networks with a long lifetime, in particular because the nodes are generally powered by batteries which are generally expensive and difficult, or indeed impossible, to replace or recharge.

Routing in a telecommunications network comprises the process of searching for a route between a source node, transmitting data, and a destination node, receiving the data. The route is the succession of nodes of the network that the data will follow between the source node and the destination node.

In wireline networks, it is conventional to select the best route as that which will most rapidly provide the response. Routing is then performed in accordance with a delay minimization algorithm.

In the context of wireless communications, such a delay minimization algorithm can also be used. Its advantage is the low complexity of processing of the management messages exchanged between the nodes of the network to establish the best route. This type of algorithm also reduces the overhead of the routing protocol.

To illustrate the operation of a delay minimization routing algorithm, reference is made to FIG. 1, which schematically shows an ad hoc network composed of five stations A-E, of which station A (for example a micro-computer) constitutes the destination node of the data, often called the "sink". It is considered here that node E is the source of the data.

To initiate the collection of the data, the sink A broadcasts a request message to search for sources. Each of the intermediate nodes B and C receives this request, processes it, then rebroadcasts it. Node D receives the request twice, once from B, and once from C. Node D processes only the first request that it receives, and ignores the second. Node D rebroadcasts the request received first. This rebroadcast is received by nodes B and C, and each of them ignores it, given that it is an already received request. Node E receives the request broadcast by B. As it is able to provide the expected data, it responds to the request by returning these data. The response message sent back by E makes it possible to identify the request. The intermediate node B has remembered that this request originated from node A, so that it forwards the response to this node A.

It is possible to verify that in such a delay minimization routing algorithm, the intermediate nodes broadcast only a single message and process only a single message.

But a drawback of the known delay minimization routing algorithms is that they do not make it possible to optimize the duration of proper operation of an ad hoc network. Specifically, the routing is performed without taking account of the energy level available at the nodes.

For example, in the case of FIG. 1, node B serves to forward not only the traffic coming from node E, but also part of the traffic whose source is node D (or even the entirety if the route ABD is systematically faster than the route ACD). Consequently, the electrical consumption of node B will be much greater than that of node C. As soon as the battery of node B fails, the ad hoc network is no longer operational. It is seen that its lifetime would have been greatly increased if the intermediate node C had been used preferably to trunk the traffic originating from D.

To alleviate this type of drawback, other families of routing algorithms have been designed for ad hoc networks. These algorithms choose the routes as a function of a metric that can take account of the residual energy of the intermediate nodes. Typically, such an algorithm chooses the routes which globally consume the least energy when all the nodes have a high energy reserve, and avoid the routes containing nodes whose residual energy is low even to the detriment of the global energy. See for example C-K. Toh, et al., "Performance Evaluation of Battery-Life-Aware Routing Schemes for Wireless Ad Hoc Networks", Proceedings of the IEEE ICC, Helsinki, June 2001, pages 2824-2829.

To illustrate these algorithms aimed at maximizing the lifetime of the network, reference is again made to FIG. 1, now assuming that node D is able to provide the response expected by the sink A. On receipt of the request sent by the sink A, each of the intermediate nodes B and C processes it by adding thereto an attribute determined as a function of its respective residual energy. This attribute allows each node which receives a request to ascertain the quantity of residual energy on the path from which it originates. The quantity of residual energy on a path corresponds here to the residual energy of the node having the lowest energy level along this path. The source node D must then process each of the two requests received from B and from C so as to decide which route to take as a function of the residual energy attribute included in each request received.

The drawback of this type of algorithm is that each intermediate node must process all the requests that it receives to update the residual energy field in the request that it will rebroadcast. This results in more complex processing in the intermediate nodes, for the reception and processing of all these requests. This is unfavorable to electrical consumption.

Moreover, to receive all the requests whose instants of arrival it does not know a priori, a node must wait a certain guard time which is difficult to adjust (too short a time causes premature decisions to be taken, while too long a time unnecessarily increases the latency of the processing). Moreover, the use of an additional attribute in the requests increases the size of the management messages (overhead), thereby also increasing energy consumption.

An object of the present invention is to simplify the routing techniques using routing metrics to optimize the performance of a telecommunications network, in particular in terms of lifetime in the case of ad hoc networks.

SUMMARY

The invention thus proposes a routing method in a network comprising a set of communication nodes, for establishing a route from at least one source node to a destination node. The method comprises the following steps:

/a/ broadcasting a request from the destination node (A);

/b/ in response to reception of the request at an intermediate node, examining whether the same request has been received beforehand by said intermediate node;

/c/ on condition that the same request has not been received beforehand by said intermediate node, systematically rebroadcasting the request from said intermediate node, with a delay ($\Delta t$) determined as a function of a routing metric associated with said intermediate node; and /d/ repeating steps /b/ and /c/ until at least one source node is reached.

The routing metric associated with an intermediate node is converted into a delay that this intermediate node lets elapse before rebroadcasting the request. The following nodes will then process only the first request that they receive.

This conversion of a metric into a delay makes it possible to effectively filter multiple requests at the intermediate nodes and at a source. It suffices for them to take account only of the first request received so as to take the metric into account implicitly.

This results in a decrease in the complexity and in the electrical consumption in the intermediate nodes.

In a preferred embodiment of the method, the delay determined at an intermediate node of the network is independent of the request to be rebroadcast. In this case, a possibility is that the intermediate node rebroadcasts the request such as it receives it. The overhead is thereby minimized since no specific field need then be provided for information useful to routing in the request message.

In the application of the invention to ad hoc wireless networks, it is advantageous that the routing metric associated with an intermediate node depend on the estimated residual energy capacity of this node. The advantages of delay minimization algorithms and of lifetime maximization algorithms are then cumulated, without suffering their drawbacks.

Preferably, the delay is a convex decreasing function of the estimated residual energy capacity of the node.

It will however be observed that other routing metrics may possibly be taken into account in the method according to the invention. For example, the routing metric associated with an intermediate node can depend on the bandwidth available at this intermediate node. The routing algorithm then tends to minimize the risk of congestion in the network.

In an embodiment of the invention, in response to reception of the request at an intermediate node which has not received the same request beforehand, an address of the node from which the request has been received by said intermediate node is stored in relation with the request in a routing table held at said intermediate node.

In another embodiment, the request comprises a routing field for containing a chain of node addresses of the network, and in response to reception of the request at an intermediate node which has not received the same request beforehand, an address of this intermediate node is added to the chain of addresses before rebroadcasting the request in step /c/. The routing table is then stored at the source node.

Another aspect of the invention pertains to a transceiver station for forming a node of a telecommunications network. This station comprises means for receiving a request coming from another node of the network, means for determining a delay as a function of a routing metric associated with the station, and means for rebroadcasting the request with said delay on the network on condition that the same request has not been received beforehand.

The invention also proposes a routing device for a node of a telecommunications network, comprising means for determining a delay as a function of a routing metric associated with the node, and means for instructing the rebroadcasting on the network, with said delay, of a request received from another node of the network, on condition that the same request has not been received beforehand.

Yet another aspect of the invention pertains to a computer program to be installed in a transceiver station forming a node of a telecommunications network, for execution by a processing unit of this station. This program comprises instructions for performing the following operations when run on said processing unit:

on receipt by the station of a request coming from another node of the network, examining whether the same request has been received beforehand by the station;

obtaining a delay determined as a function of a routing metric associated with the station; and if it has not been received beforehand by the station, instructing rebroadcasting of the request on the network with said delay.

BRIEF DESCRIPTION OF THE DRAWINGS

Other features and advantages of the present invention will appear in the description hereinafter of nonlimiting exemplary embodiments, with reference to the appended drawings, in which.

DETAILED DESCRIPTION OF THE EMBODIMENTS

Figure 1:
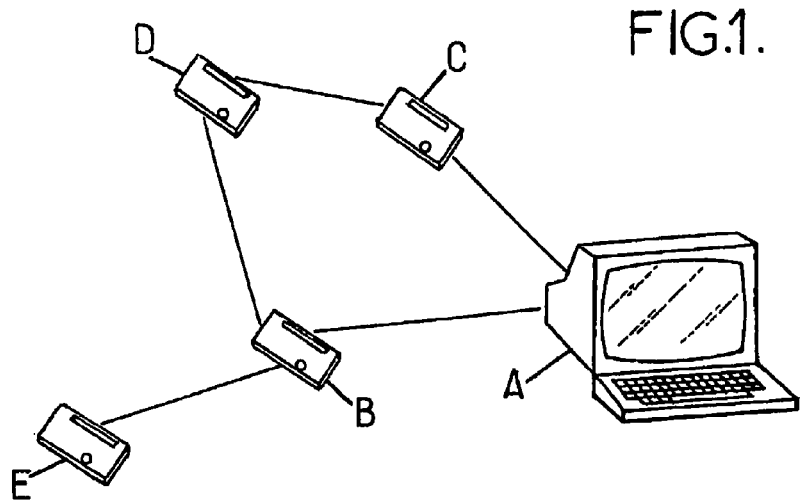
FIG. 1 is a diagram of an ad hoc wireless network to which the invention is applicable.
Figure 2:
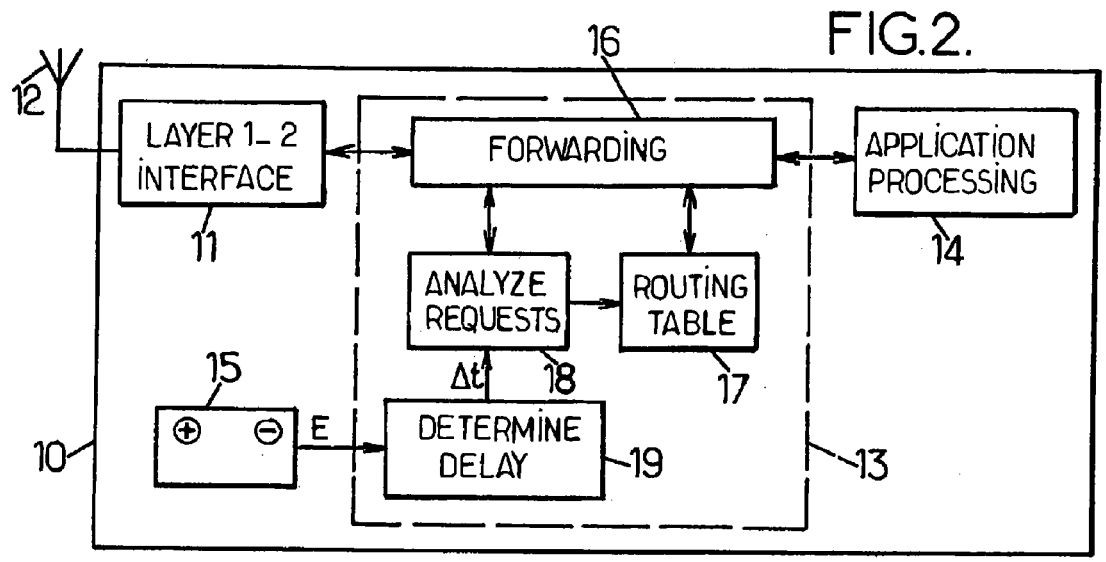
FIG. 2 is a schematic diagram of an exemplary sending-receiving station according to the invention.

The transceiver station 10 illustrated in FIG. 2 is intended to constitute a node of a wireless ad hoc network.

It comprises a wireless interface module 11 linked to its antenna 12, which performs the physical layer and link layer processing (layers 1 and 2 of the OSI model) in accordance with the wireless technology implemented in the ad hoc network. The medium access control (MAC) protocols usable by the module 11 are well known and can be of varied type (SMAC, TMAC, TRAMA, WiseMAC, BMAC, etc.). In general, each message or packet or frame incorporates an address of the node which transmitted it and an address of the node or nodes for which it is intended.

The network layer processing (layer 3 of the OSI model) is performed by a module 13 of the station 10 while the application layer processing, dependent on the type of node, is performed by a module 14. Depending on the type of station, the module 14 can cooperate with one or more sensors and/or one or more actuators (not represented). It can also ensure supervision or control functions.

The various circuits of the station 10 are supplied with electrical power from a source 15 such as a battery.

In most cases, the digital processing in modules 11, 13, 14 is executed by a central processor of the station 10, under the control of appropriate programs. One of these programs, in accordance with the invention, is run in module 13.

This module 13 ensures in particular the forwarding 16 of the network messages passing through the station 10, by checking the addresses used by the MAC protocol. The forwarding function 16 cooperates with a routing table 17 stored in the station. When the station 10 acts as intermediate node for routing a message, the forwarding function 16 accesses the routing table 17 to obtain the address of the next node to which the message will have to be transmitted. A broadcasting address is generally provided for broadcasting, in the neighborhood of the station 10, messages with no recipient specification.

The module 13 further comprises a function 18 for analyzing request messages broadcast within the framework of the routing protocol.

These request messages are identified as such, thereby making it possible to transfer them to the analysis function 18 when they are received. Each request for information originating from a destination node (sink) of the network includes an identifier which makes it possible to distinguish it from the other requests, and also to ascertain at the level of each intermediate node whether the same request has already been received previously.

In accordance with the invention, if the request received within the framework of the routing protocol must be rebroadcast by the station 10, this rebroadcasting occurs with a delay $\Delta t$ determined by a unit 19 of the module 13 as a function of a routing metric associated with the station 10.

In a preferred embodiment, this routing metric is a function of the residual energy capacity of the station. A measurement E of the energy level remaining in the battery 15 is provided to the determining unit of 19, and the latter deduces therefrom a delay $\Delta t$ used for rebroadcasting the routing requests.

Figure 3:
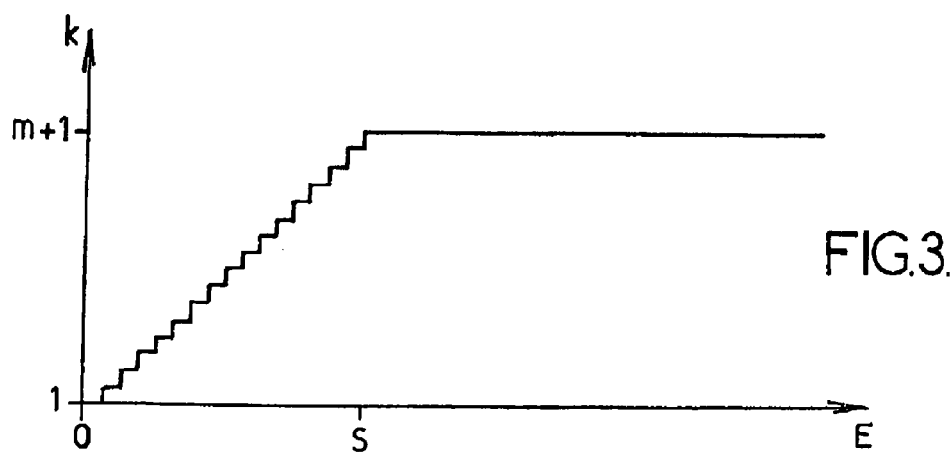
FIGS. 3 and 4 show an example of quantizing the levels of residual energy and calculating transmission delay as a function of this metric.

In the example represented in FIG. 3, the measured energy level E is converted on m discrete levels between E=0 and E=S, where S is a protection threshold for the battery corresponding to a defined fraction of its maximum energy. In this example, the metric k takes its values between 1 and m+1, according to:

$$k = \begin{cases} \left\lceil \frac{E.m}{S} \right\rceil & \text{if } E \leq S \\ m+1 & \text{otherwise} \end{cases} \quad (1)$$

where $\lceil x \rceil$ designates the integer equal to or immediately greater than x.

Figure 4:
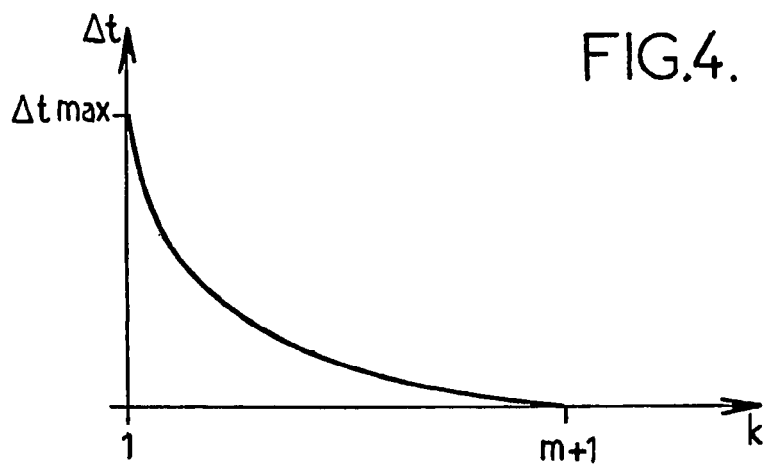

The function f which gives the delay $\Delta t$ to be used as a function of the energy level E or of its quantized value k is advantageously a convex decreasing function, such as for example a hyperbolic shaped function such as that represented in FIG. 4. This convexity property ensures to a first approximation that, when at least one node falls under the threshold S, the selection of a route from among several possible routes is done on the basis of the maximum, over these various routes, of the residual energy of the weakest node.

In practice, the unit 19 will generally not undertake an explicit calculation of the delay. Delay values will be prerecorded in a table to be read in a manner dependent on the residual energy level.

Figure 5:
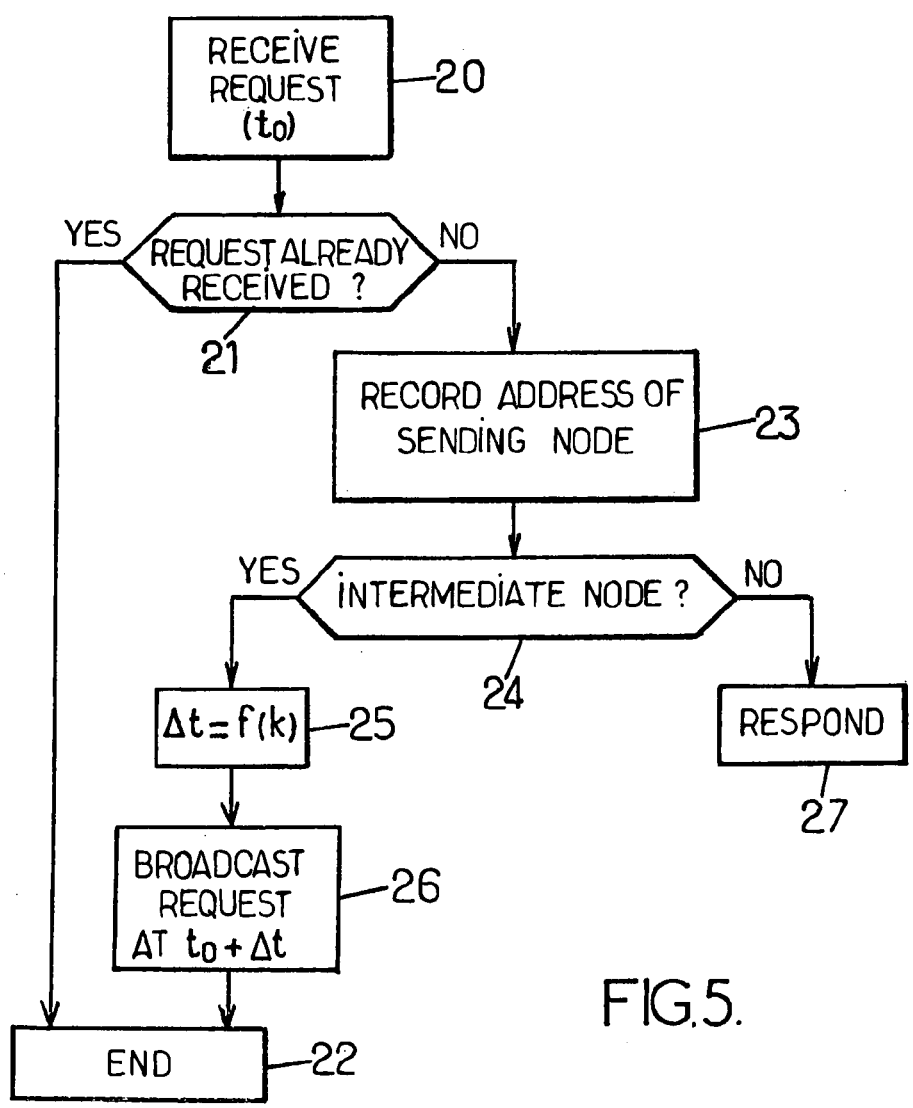
FIG. 5 is a flowchart of the processing operations performed in an intermediate node of the network in accordance with an embodiment of the invention.

FIG. 5 presents a flowchart corresponding to the function for analyzing the requests 18 of FIG. 2. The operations represented are triggered following reception 20 of a routing request at an instant $t_0$.

Initially, the processing for receiving the request is performed only partially so as to extract therefrom the identifier. If the identifier extracted corresponds to that of a request already previously received, i.e. to a request identifier already present in the routing table 17, the procedure for processing the request received terminates (step 22). The processing operations performed on a request already received beforehand are therefore minimal.

If the test 21 shows that the request received had not previously been received, the processing for receiving this request is completed. The address of the node from which this request has just been sent is extracted therefrom in step 23 so as to be recorded in the routing table 17 in relation with the identifier of the request. The transmitting node whose address is thus recorded is that which precedes the station 10 along the route followed, and which therefore will follow it in reverse to forward the response, if any.

Thereafter, the program determines whether the station 10 is able to respond to the request by providing the data asked for. If it is not, it acts only as intermediate node along the route and the test 24 is followed by the step 25 of obtaining the delay $\Delta t=f(k)$, subsequent to which the function 18 instructs the rebroadcasting of the request in the neighborhood of the station 10 at the instant $t_0+\Delta t$ (step 26). This rebroadcasting 26 terminates the processing performed in conjunction with the request received in step 20.

If the station 10 constitutes a destination node (no in test 24), then the application module 14 is asked to provide the requested data. The response message thus constructed (step 27) is forwarded to the address which has been recorded in the routing table 17 in step 23.

The response message includes the identifier of the request to which it responds. This allows the intermediate nodes along the route to look up their respective routing tables to perform the forwarding towards the succeeding nodes up to the sink.

In an alternative embodiment, the intermediate nodes of the network do not comprise any routing table. The latter is stored in the source node. The routing protocol request messages may then have a routing field intended to contain a chain of addresses corresponding respectively to the nodes encountered along the route to be employed. The request is sent initially by the sink which places its address in this field. The intermediate nodes provisionally memorize the identifiers of the requests that they have received. On receipt of a request message, an intermediate node examines whether it is a request that it has received recently. If so, it ignores the new reception of the request. If not, it determines the delay to be applied, in the manner previously described, then it rebroadcasts the request with this delay. The intermediate node adds its own address to the chain of addresses found in the aforesaid field, so as to rebroadcast a completed request. When the request reaches a source node, the latter thus has the addresses of the successive nodes of the route that the response will have to follow. This route can be stored in the source node. The response message has a field that includes the chain of addresses, which allows the intermediate nodes to forward this response message up to the sink.

In the preceding description, the routing metric is presented by way of example as being a function of the residual energy capacity of the station. However, the applicant does not intend to limit the scope of his application to this particular example, but to extend it to any type of routing metric.

The invention claimed is:

1. A routing method in a network having a set of communication nodes, for establishing a route from at least one source node to a destination node, comprising:
   /a/ broadcasting a request from the destination node;
   /b/ in response to reception of the request at an intermediate node, examining whether the request has been received beforehand by said intermediate node;
   /c/ on condition that the request has not been received beforehand by said intermediate node, systematically rebroadcasting the request from said intermediate node, with a delay that is a function of a routing metric associated with said intermediate node; and
   /d/ repeating steps /b/ and /c/ until the at least one source node is reached.

2. The method as claimed in claim 1, wherein the delay determined at an intermediate node is independent of the request to be rebroadcast.

3. The method as claimed in claim 1, wherein the routing metric associated with an intermediate node depends on an estimated residual energy capacity of said intermediate node.

4. The method as claimed in claim 3, wherein the delay is a convex decreasing function of the estimated residual energy capacity.

5. The method as claimed in claim 1, wherein the routing metric associated with an intermediate node depends on a bandwidth available to said intermediate node.

6. The method as claimed in claim 1, wherein, in response to reception of the request at an intermediate node which has not received the request beforehand, an address of the node from which the request has been received by said intermediate node is stored in relation with the request in a routing table held at said intermediate node.

7. The method as claimed in claim 1, wherein the request comprises a routing field for containing a chain of node addresses of the network, and wherein, in response to reception the request at an intermediate node which has not received the request beforehand, an address of said intermediate node is added to the chain of addresses of said field before rebroadcasting the request in step /c/.

8. A transceiver station for forming a node of a telecommunications network, the station comprising:
   a receiver configured to receive a request coming from another node of the network and initially arising from a destination node;
   a processor configured to determine a delay as a function of a routing metric associated with the station; and
   a transmitter configured to systematically rebroadcast the request with said delay on the network on condition that the request has not been received beforehand and that the transceiver station is not identified as a source node in said request.

9. A routing device for a node of a telecommunications network, comprising:
   a processor configured to determine a delay as a function of a routing metric associated with the node; and
   a controller configured to systematically instruct rebroadcasting on the network, with said delay, of a request received from another node of the network and initially arising from a destination node, on condition that the request has not been received beforehand and that the routing device is not identified as a source node in said request.

10. A non-transient computer readable medium storing a computer program for execution by a transceiver station forming a node of a telecommunications network, the program comprising steps for:
   on receipt by the station of a request coming from another node of the network and initially arising from a destination node, examining whether the request has been received beforehand by the station;
   obtaining a delay determined as a function of a routing metric associated with the station; and
   if the request has not been received beforehand by the station and if the station is not identified as a source node by said request, systematically instructing rebroadcasting of the request on the network with said delay.

* * * * *